United States Patent
Kroeger et al.

(10) Patent No.: US 6,639,949 B2
(45) Date of Patent: Oct. 28, 2003

(54) METHOD AND APPARATUS FOR PULSE OVERLAP PRE-COMPENSATION IN DIGITALLY MODULATED SIGNALS

(75) Inventors: Brian William Kroeger, Sykesville, MD (US); Joseph Bertram Bronder, New Market, MD (US)

(73) Assignee: iBiquity Digital Corporation, Columbia, MD (US)

( * ) Notice: Subject to any disclaimer, the term of this patent is extended or adjusted under 35 U.S.C. 154(b) by 0 days.

(21) Appl. No.: 10/022,632

(22) Filed: Dec. 17, 2001

(65) Prior Publication Data

US 2003/0112890 A1 Jun. 19, 2003

(51) Int. Cl.[7] .......................... H04K 1/02; H04L 25/03; H04L 25/49
(52) U.S. Cl. .......................... 375/296; 375/285; 455/63
(58) Field of Search .............................. 375/295, 296, 375/297, 285, 219, 222, 223, 221, 232, 230, 229, 233; 455/296, 501, 63; 381/3, 4, 14, 94, 98, 103; 282/244

(56) References Cited

U.S. PATENT DOCUMENTS

| | | | |
|---|---|---|---|
| 4,903,317 A | * | 2/1990 | Nishihara et al. ........... 382/244 |
| 5,404,378 A | | 4/1995 | Kimura |
| 5,588,022 A | | 12/1996 | Dapper et al. |
| 5,598,436 A | | 1/1997 | Brajal et al. |
| 5,732,333 A | | 3/1998 | Cox et al. |
| 5,740,520 A | * | 4/1998 | Cyze et al. .................... 455/69 |
| 5,790,516 A | | 8/1998 | Gudmundson et al. |
| 5,859,876 A | | 1/1999 | Dapper et al. |
| 5,872,814 A | * | 2/1999 | McMeekin ................... 375/296 |
| 6,072,364 A | | 6/2000 | Jeckeln et al. |
| 6,445,750 B1 | | 9/2002 | Chen et al. |

OTHER PUBLICATIONS

H. Nyquist, "Certain Topics in Telegraph Transmission Theory," *Trans. Am. Inst. Electr. Eng.*, Feb. 1928, pp. 617–644.

* cited by examiner

Primary Examiner—Phuong Phu
(74) Attorney, Agent, or Firm—Robert P. Lenart, Esq.; Pietragallo, Bosick & Gordon

(57) ABSTRACT

A method of pre-compensating for pulse overlap in a digitally modulated signal comprises the steps of receiving a sequence of pulses, modulating the pulses to produce a first sequence of modulated pulses, demodulating the first sequence of modulated pulses to produce a first sequence of demodulated pulses, combining the first sequence of demodulated pulses with the first sequence of pulses to produce a first sequence of error pulses, modulating the first sequence of error pulses to produce a first sequence of modulated error pulses, and combining the first sequence of modulated error pulses with the first sequence of modulated pulses to produce a first sequence of compensated pulses. The invention further encompasses a method of pre-compensating for pulse overlap in a digitally modulated signal comprising the steps of receiving a sequence of pulses, modulating the pulses to produce a sequence of modulated pulses, storing the modulated pulses, using non-consecutive pairs of the modulated pulses to produce a sequence of first order error terms, storing the sequence of first order error terms, and subtracting each of the first order error terms from corresponding ones of the modulated pulses to produce a first compensated signal.

16 Claims, 3 Drawing Sheets

METHOD AND APPARATUS FOR PULSE OVERLAP PRE-COMPENSATION IN DIGITALLY MODULATED SIGNALS

BACKGROUND OF THE INVENTION

This invention relates to radio broadcasting, and more particularly, to AM In-Band-On-Channel (IBOC) Digital Audio Broadcasting (DAB), and signal processing in AM IBOC DAB transmitters.

Digital Audio Broadcasting is a medium for providing digital-quality audio, superior to existing analog broadcasting formats. AM IBOC DAB can be transmitted in a hybrid format where it coexists with the AM signal, or it can be transmitted in an all-digital format where the removal of the analog signal enables improved digital coverage with reduced interference. IBOC requires no new spectral allocations because each DAB signal is simultaneously transmitted within the same spectral mask of an existing AM channel allocation. IBOC promotes economy of spectrum while enabling broadcasters to supply digital quality audio to their present base of listeners.

U.S. Pat. No. 5,588,022 discloses a hybrid AM IBOC broadcasting method for simultaneously broadcasting analog and digital signals in a standard AM broadcasting channel that includes the steps of broadcasting an amplitude modulated radio frequency signal having a first frequency spectrum, wherein the amplitude modulated radio frequency signal includes a first carrier modulated by an analog program signal, and simultaneously broadcasting a plurality of digitally modulated carrier signals within a bandwidth which encompasses the first frequency spectrum, each of the digitally modulated carrier signals being modulated by a portion of a digital program signal. A first group of the digitally modulated carrier signals lie within the first frequency spectrum and are modulated in-quadrature with the first carrier signal. Second and third groups of the digitally modulated carrier signals lie outside of the first frequency spectrum and are modulated both in-phase and in-quadrature with the first carrier signal.

In AM IBOC DAB systems, frequency domain side lobe constraints together with symbol rate and sub-carrier spacing requirements can lead to signal pulse trains with overlapping pulses. The AM transmission comprises a train of orthogonal frequency division multiplexed (OFDM) pulses. The pulses are made up of evenly spaced sub-carriers. The digitized data is subdivided into "m" bit words, converted to amplitude and phase values and then assigned to the sub-carriers. The shape of the pulses is selected so that the sub-carriers are orthogonal to one another when matched filtering is applied at the receiver. In this way, matched filtering can recover the amplitude and phase information for each individual sub-carrier and thereby recover the value of each digital word.

One way of ensuring the required orthogonality is to use rectangular pulses whose duration is the reciprocal of the sub-carrier spacing. The use of non-overlapping rectangular pulses has the desirable feature of maximizing the transmission rate. The main drawback, however, is excessive side lobe levels. Moreover, achieving the desired orthogonality requires exact frequency centering.

The problem of preserving orthogonality while reducing side lobe levels has a time domain dual that was the subject of a classic paper by Nyquist (Nyquist, H., "Certain Topics in Telegraph Transmission Theory," Trans. Am. Inst. Electr. Eng., vol. 47, April 1928, pp. 617–644). The solution is to extend the length of the rectangular pulse and apply a raised cosine weighting to the result. The transmitter and receiver split the weighting with the transmitter and receiver each applying the square root of the weights.

The waveform used in one AM digital audio broadcasting system is the convolution of a Nyquist type pulse with the Gaussian density function. This construction guarantees that the frequency domain side-lobes meet spectral mask requirements imposed by the FCC. The length of the Nyquist pulse is one OFDM symbol period. Convolution increases the pulse length. As a result, the pulses in the transmitted pulse train overlap. The presence of this overlap introduces distortion in the output of the demodulator.

The distortion caused by pulse overlap has an effect similar to that of noise; i.e. demodulator outputs are displaced from their assigned constellation locations. When a large number of demodulator outputs are superimposed on a graph, they give a fuzz-like appearance to the demodulated signal constellation.

It would be desirable to reduce distortion caused by pulse overlap. This invention seeks to provide a method for pre-compensating signal pulses of an AM IBOC digital audio broadcasting system to reduce distortion.

SUMMARY OF THE INVENTION

This invention provides a method of pre-compensating at the transmitter for pulse overlap in a digitally modulated signal comprising the steps of receiving a sequence of pulses, modulating the pulses to produce a first sequence of modulated pulses, demodulating the first sequence of modulated pulses to produce a first sequence of demodulated pulses, combining the first sequence of demodulated pulses with the first sequence of pulses to produce a first sequence of error pulses, modulating the first sequence of error pulses to produce a first sequence of modulated error pulses, and combining the first sequence of modulated error pulses with the first sequence of modulated pulses to produce a first sequence of compensated pulses.

The invention further encompasses a method of pre-compensating for pulse overlap in a digitally modulated signal comprising the steps of receiving a sequence of pulses, modulating the pulses to produce a sequence of modulated pulses, storing the modulated pulses, using non-consecutive pairs of the modulated pulses to produce a sequence of error first order terms, storing the sequence of first order error terms, and subtracting each of the first order error terms from corresponding ones of the modulated pulses to produce a first compensated signal.

Transmitters that process signals in accordance with the above methods are also included.

DETAILED DESCRIPTION OF THE INVENTION

Figure 1:
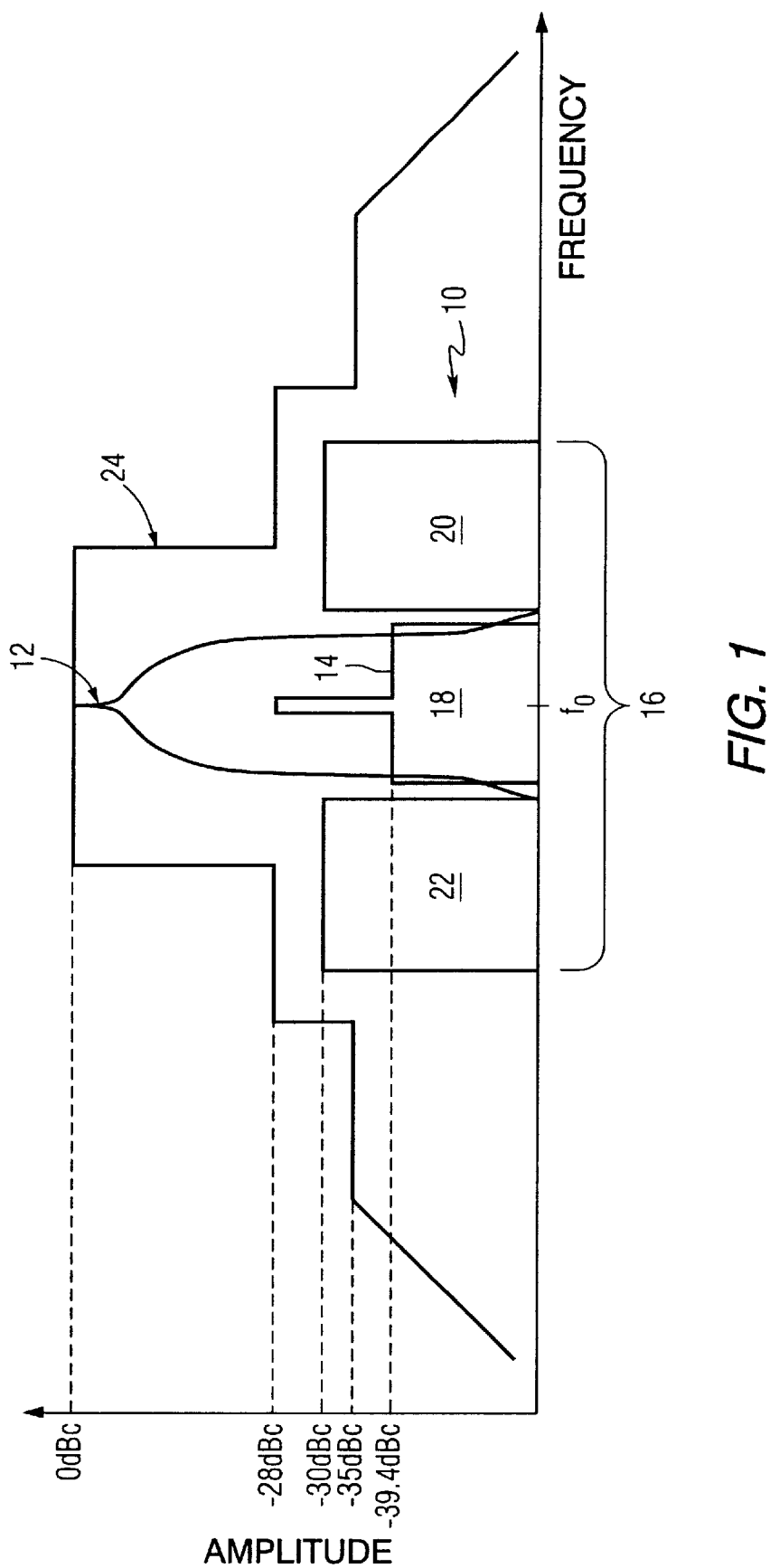
FIG. 1 is a schematic representation of an AM hybrid IBOC DAB signal, showing relative levels of AM and DAB signals.

Referring to the drawings, FIG. 1 is a schematic representation of an AM hybrid IBOC DAB composite signal 10, showing relative levels of the analog modulated AM and digitally modulated DAB signals. The hybrid format includes the conventional AM analog signal 12 along with a DAB signal 14 transmitted beneath the AM signal. The DAB signal includes a plurality of data carriers, evenly spaced in frequency. The digitally modulated carriers are generated via orthogonal frequency division multiplexing (OFDM). This format enables the spectra of these carriers to be overlapped without any intervening guard bands, thereby optimizing spectral utilization. However, a guard interval can be used in the time domain to compensate for signal timing jitter. The OFDM modulation technique is extremely beneficial for successful DAB operation since bandwidth is a premium commodity in the AM band. An additional advantage is that there is no need to isolate the DAB digital carriers from each other via filtering in either the transmitter or receiver since the orthogonality condition of OFDM minimizes such interference.

As shown in FIG. 1, the DAB carriers are contained within a channel 16 having a bandwidth of 30 kHz. The channel is divided into a central frequency band 18, and upper 20 and lower 22 frequency bands. The central frequency band is about 10 kHz wide and encompasses frequencies lying within ±5 kHz of the central frequency of the channel. The upper sideband extends from about +5 kHz from the central frequency to about +15 kHz from the central frequency. The lower sideband extends from about −5 kHz from the central frequency to about −15 kHz from the central frequency. The FCC emissions mask is represented by item number 24.

The composite analog and digital DAB waveform includes a plurality of modulated carriers that are fully compliant with the FCC emissions mask. A first group of the digitally modulated carriers are positioned within a frequency band illustrated by the envelope labeled 14 in FIG. 1. Most of these signals are placed 30 to 40 dB lower than the level of the unmodulated AM carrier signal in order to minimize crosstalk with the analog AM signal. Crosstalk is further reduced by encoding this digital information in a manner that guarantees orthogonality with the analog AM waveform. This type of encoding is called complementary modulation (i.e. complementary BPSK, complementary QPSK, or complementary 16 QAM) and is more fully described U.S. Pat. No. 5,859,876.

Additional groups of quadrature amplitude modulated digital signals are placed outside the first group. The need for these digital waveforms to be in-quadrature with the analog signal is eliminated by restricting the analog AM signal bandwidth. U.S. Pat. No. 5,588,022 discloses additional information relating to IBOC DAB waveforms and is hereby incorporated by reference.

Figure 2:
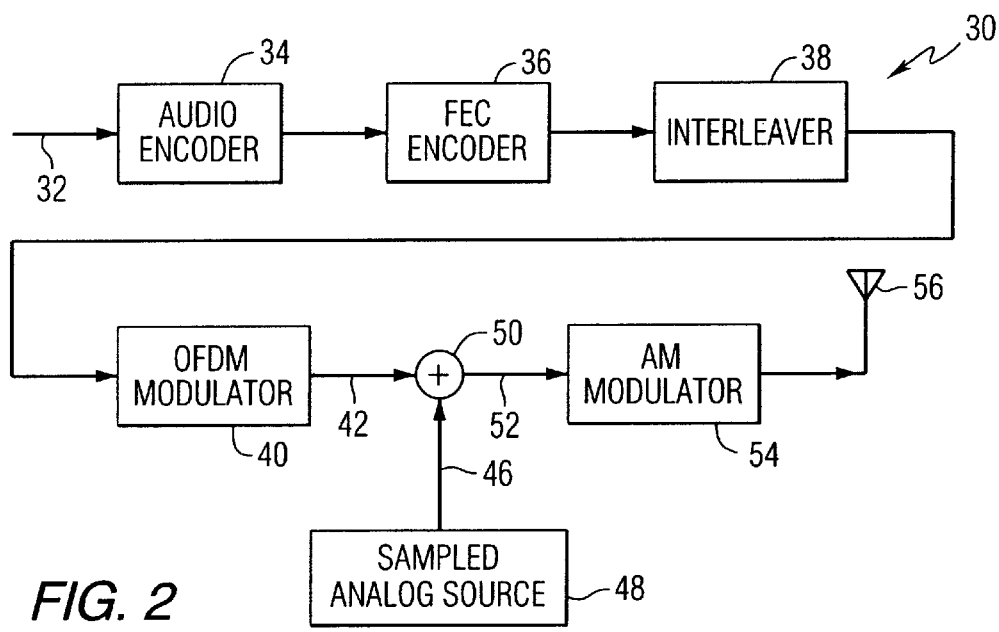
FIG. 2 is a simplified block diagram of relevant portions of an IBOC DAB transmitter, which may incorporate the pre-compensation method of the present invention.

FIG. 2 is a block diagram of a portion of an AM IBOC DAB transmitter 30 showing the signal processing functions that are relevant to this invention. A sampled audio signal is received on line 32. An audio encoder 34 converts the sampled audio into a digital signal. This digital signal is subjected to forward error correction as illustrated in FEC encoder block 36. The FEC signal is interleaved as shown by interleaver block 38. The resulting interleaved signal is modulated by a Fast Fourier Transform modulator 40 to produce the DAB signal on line 42. To produce the analog signal on line 46, a sampled audio signal is supplied by source 48. The analog signal on line 46 and the digital signal on line 42 are combined in summation point 50 to produce the composite signal on line 52, that is subsequently modulated by AM modulator 54 and ultimately delivered to antenna 56. The signal transmitted by the antenna has the general form shown by the waveform of FIG. 1.

Figure 3:
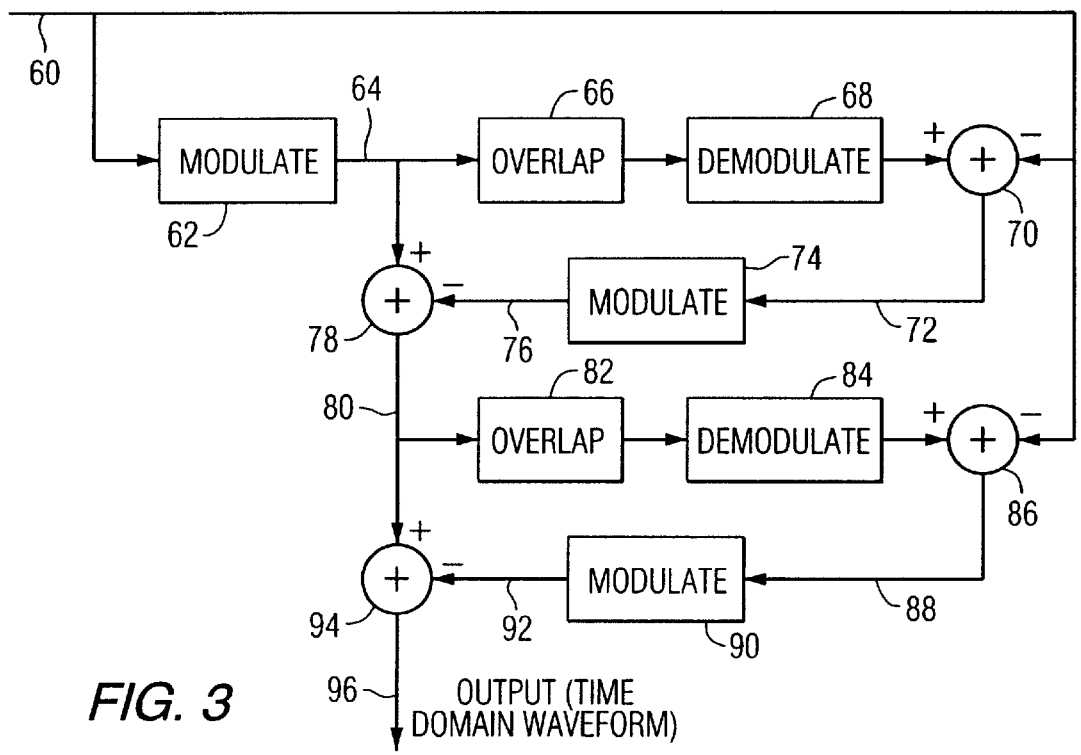
FIG. 3 is functional block diagram that illustrates the operation of the invention.

In the AM system, frequency domain side lobe constraints together with symbol rate and sub-carrier spacing requirements lead to pulse trains with overlapping pulses. Pulse overlap introduces distortion at the output of the receiver demodulator. This distortion appears as "fuzz" in the demodulated constellations. FIG. 3 is functional block diagram that illustrates the operation of the invention. The functions illustrated in FIG. 3 can be performed in combination with the modulator illustrated by block 40 of FIG. 2. As shown in FIG. 3, a plurality of OFDM pulses in the frequency domain is received on line 60. These pulses are modulated as shown in block 62 to produce a first modulated signal on line 64. This produces pulse overlap as illustrated by block 66. The overlapped pulses are demodulated as shown by block 68 and subtracted from the original pulses in summation point 70. The resulting first error signal on line 72 is then modulated as shown in block 74 and the second modulated signal on line 76 is subtracted from the first modulated signal at summation point 78. This results in a first compensated signal on line 80, comprising a plurality of compensated pulses. Since the compensated pulses will overlap, the demodulator output will still contain distortion. So the process can be repeated until the distortion reaches an acceptable level. In FIG. 3, one additional demodulation/modulation sequence is shown. The compensated pulses on line 80 contain overlap as shown by block 82. The compensated pulses are demodulated as shown by block 84 and subtracted from the original pulses in summation point 86. The resulting second error signal on line 88 is then modulated as shown in block 90 and the resulting third modulated signal on line 92 is subtracted from the first compensated signal at summation point 94. This results in a second compensated signal output in the time domain that includes a second plurality of pre-compensated pulses on line 96. Some level of overlap will still be contained in the pulses on line 96.

The invention takes advantage of the fact that a quantitative value for the distortion is available at the transmitter, since the train of overlapping pulses can be demodulated and subtracted from the demodulator input. The error, that is, the difference between modulator input and demodulator output, can be subtracted from the modulator input to form a train of pre-compensated pulses.

Figure 4:
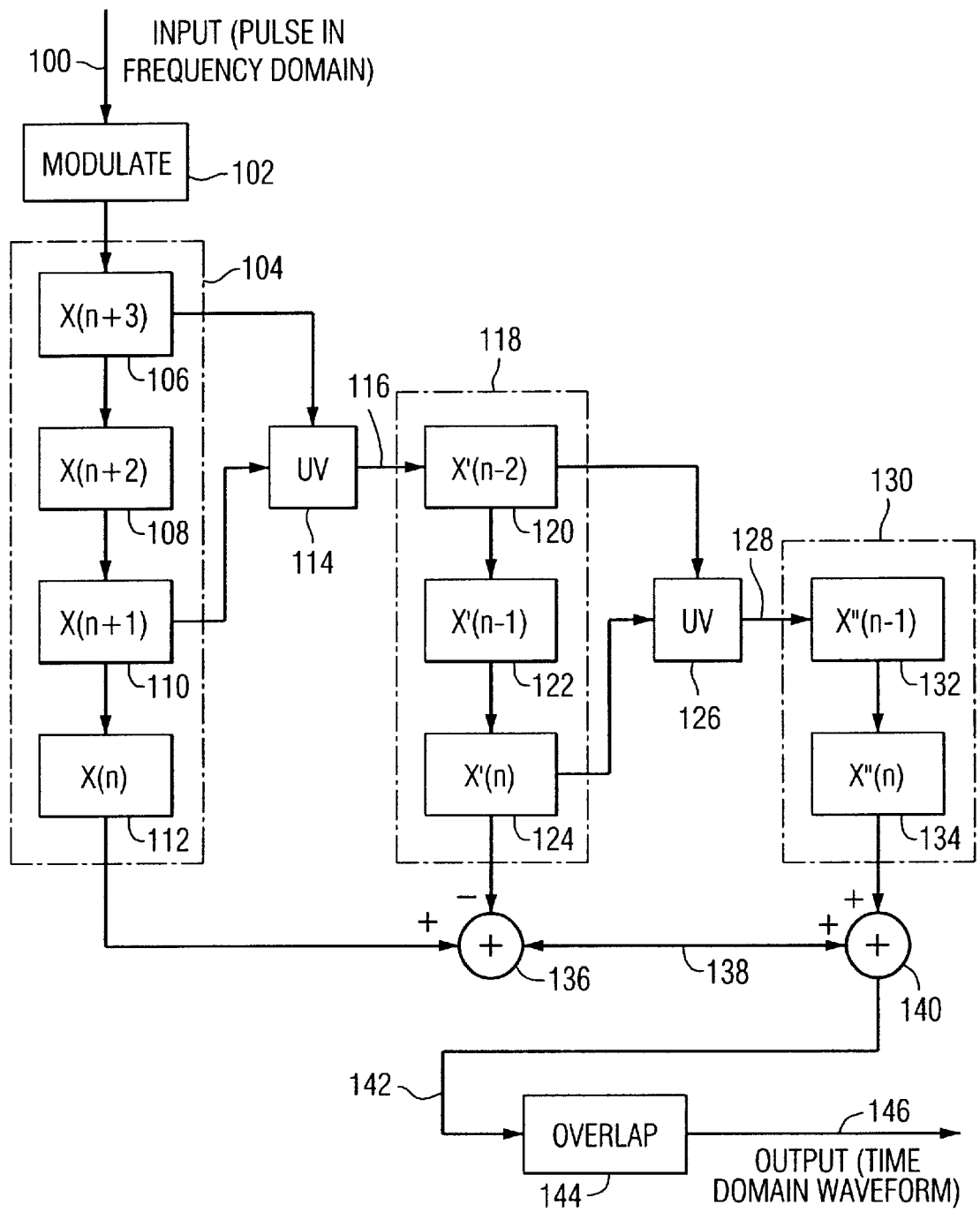
FIG. 4 is a more detailed functional block diagram that illustrates the operation of the invention.

Rather than implement the computationally intensive procedure described in FIG. 3, the pulse over-lap pre-compensation of this invention can be implemented using formulas that efficiently perform the demodulation function followed by re-modulation. FIG. 4 is a functional block diagram that illustrates the operation of the more efficient approach.

The constellation data corresponding to each OFDM pulse is received on line 100 and modulated as shown by block 102. The inputs to the modulation process are sequences of complex words. These complex words are restricted to a set of values that form a lattice in the complex plane. This lattice is often referred to as a constellation.

The bits of the digital bit stream that forms the input to the OFDM system are assembled into words of fixed length. The word length corresponds to the base 2 log of the number of points in the constellation. To obtain the complex words that form the input to the modulation process, the digital words are used as addresses to a table of the constellation values.

The modulated pulses are entered into a shift register type memory 104 that includes a plurality of memory locations 106, 108, 110 and 112. Two non-consecutive modulated pulses (separated by one pulse) are combined in a process denoted by "UV" in block 114 of the diagram to produce a plurality of first order error terms on line 116.

The "UV" process is defined below. The first order error terms are also stored in a shift register type memory 118 having a plurality of memory locations 120, 122 and 124. The UV process is applied again as shown in block 126, this time to the first order error terms, to obtain a plurality of second order error terms on line 128. The second order error terms are stored in another shift register type memory 130, having memory locations 132 and 134. This process can be expanded using combinations of higher order errors to derive error terms of any order.

The first order error terms are summed with the modulator outputs at summation point 136, and the resulting signal on line 138 is summed with the second order error terms at summation point 140. The resulting signal on line 142 contains an overlap as shown by block 144. In the transmitter output, the compensated pulses must overlap since the compensation process does not reduce the lengths of the individual pulses. The implementation shown in FIG. 4 produces outputs in blocks of 270 samples (the symbol period). But the pulse length is 349 samples. Therefore, the processing applies the compensation to all 349 samples of the current pulse. It then adds the first 79 samples of the current pulse with the last 79 samples of the previous compensated pulse and outputs that sum together with the next 191 samples of the current pulse (after compensation). It then saves the last 79 samples of the current compensated pulse for combining with the next compensated pulse. The final pre-compensated pulses are output on line 146.

FIG. 3 shows why the compensation process affects non-consecutive pulses. The overlap 66 "simulates" the distortion that occurs when the pulses are assembled into a pulse train. It is this distortion that the compensation of this invention attempts to remove. The demodulation 68, differencing 70, and modulation 74 produce the compensation term 76 so that the subtraction 78 produces error free pulses. But the lengths of these pulses still exceed the symbol period. Therefore, the compensated pulses will overlap one another, when assembled into a pulse train. The overlap 82 accounts for that overlap and the demodulation 84, differencing 86, modulation 90, and subtraction 94 correct the second source of error, i.e. the overlap 82. Now the results of the first compensation 66, 68, 70, 74 and 78 produce error terms that arise from the pulses on either side of a given pulse; i.e. for the n-th pulses, the (n−1)-th, n-th and (n+1)-th pulses affect the error term 76. Consequently, the (n−1)-th, n-th and (n+1)-th pulses affect the output 80 for the n-th pulse. The overlap 82 combines three consecutive pulses from the output 80 and therefore is affected, through the error terms 76, by five consecutive pulses. In this way, the compensation process extends beyond the pulses on either side of a given pulse.

The algorithm used to perform the functions illustrated in FIG. 4 will now be described in greater detail. The algorithm input is a sequence, $\{X_n(m)\}$, of complex valued constellations where n denotes the pulse number and m is an index that varies from 1 to 256. For any n, $X_n(m)$ is non-zero only for those values of m, which correspond to an active sub-carrier including the BPSK and IDS sub-carriers. The table below, lists the indices of the active sub-carriers. As indicated in that table, the number and location of the active sub-carriers is mode dependent. The main carrier is inserted later in the transmitter processing sequence.

The outputs of the algorithm are 270 sample pulses, which, when concatenated, form a train of overlap pre-compensated pulses. Each of these algorithm output pulses begins with the 79 sample overlapped portion of two consecutive pre-compensated pulses. The remaining 191 samples of the algorithm output are the un-overlapped portion of the second of the two pre-compensated pulses. To be more precise, if $x_n(k)$, k=1,2, . . . , 349 denotes the n-th overlap pre-compensated pulse, then the corresponding algorithm output is:

$$y_n(k) = \begin{cases} x_{n-1}(k+191) + x_n(k), & k = 1, 2, \ldots, 93, \\ x_n(k), & k = 94, 95, \ldots, 270 \end{cases}$$

The algorithm repeats at the OFDM symbol rate, 1488375/32/270=11025/64~172.266 Hz.

The average effective output rate is the AM sample rate: (11025/64)270~46512 Hz.

The processing begins with OFDM modulation. The modulator output, $x_n^{(0)}$, is given by:

$$x_n^{(0)}(k) = w(k)\frac{1}{N}\sum_{m=1}^{N} X_n(m) \cdot \exp\left(2 \cdot \pi \cdot j \cdot \frac{(k-1+82) \cdot (m-1)}{N}\right),$$

for $k = 1, 2, \ldots, 349$ where $X_n(m)$ denotes the complex constellation points and w(k), k=1,2, . . . , 349, are the terms of the root raised cosine window.

The pre-distorted pulse, $x_n$, is given by $$x_n = x_n^{(0)} - \sum_{r=1} e_n^{(r)}$$

where the terms, $e_n^{(r)}$, are 349 point column vectors defined next.

For any integer r≧1, define the r-th error term for the n-th pulse, $e_n^{(r)}$, as follows:

$$e_n^{(1)} = \lfloor U \cdot x_{n+1}^{(0)} + V \cdot x_{n-1}^{(0)} \rfloor$$

and $$e_n^{(r+1)} = -\lfloor U \cdot e_{n+1}^{(r)} + V \cdot e_{n-1}^{(r)} \rfloor$$

where U and V are 349 by 349 matrices and $x_{n+1}^{(0)}$ and $x_{n-1}^{(0)}$ are interpreted as column vectors. The matrices U and V are defined by $$U_{u,v} = \begin{cases} w^2(u), & u = 271, \ldots 349, \quad v = u - 270 \\ w(u)w(u+N), & u = 15, 16, \ldots, 93, \quad v = u + N - 270 \\ 0, & \text{otherwise} \end{cases}$$

$$V_{u,v} = \begin{cases} w^2(u), & u = 1, 2, \ldots, 79, \quad v = u + 270 \\ w(u)w(u-N), & u = 257, 258, \ldots, 335, \quad v = u + 270 - N \\ 0, & \text{otherwise} \end{cases}$$

The 349 by 349 matrices defined above are convenient for notational purposes but are cumbersome (and unnecessary) for computations. The following steps evaluate U·a+V·b, where a and b are 349 point column vectors.

c(k)=0, k=1, 2, . . . , 349
c(k)=$w^2$(k)·a(k−270), for k=271, 272, . . . , 349
c(k)=w(k)·w(k+256)·a(k−14), for k=15, 16, . . . , 93,
c(k)=c(k)+$w^2$(k)·b(k+270), for k=1, 2, . . . , 79
c(k)=c(k)+w(k)·w(k−256)·b(k+14), for k=257, 258, . . . , 335

Modulator inputs that do not correspond to active sub-carriers are set to zero. The following table shows the modulator inputs that contain non-zero data together with the relationship between modulator input number and sub-carrier index relative to the position of the main carrier.

| Hybrid Mode | | All Digital Mode | |
|---|---|---|---|
| DFT Output Numbers | Sub-carrier Indices | DFT Output Numbers | Sub-carrier Indices |
| 2 through 53 | +1 through +52 | 2 through 53 | +1 through +52 |
| 58 through 82 | +57 through +81 | 205 through 256 | −52 through −1 |
| 176 through 200 | −81 through −57 | | |
| 205 through 256 | −52 through −1 | | |

The above process can be performed in an apparatus for pre-compensating for pulse overlap in a digitally modulated orthogonal frequency multiplexed signal, the device comprising an input receiving a sequence of pulses, a first modulator for modulating the pulses to produce a first sequence of modulated pulses, a first demodulator for demodulating the first sequence of modulated pulses to produce a first sequence of demodulated pulses, a first combiner for combining the first sequence of demodulated pulses with the first sequence of pulses to produce a first sequence of error pulses, a second modulator for modulating the first sequence of error pulses to produce a first sequence of modulated error pulses, and a second combiner for combining the first sequence of modulated error pulses with the first sequence of modulated pulses to produce a first sequence of compensated pulses.

The apparatus can further comprise a second demodulator for demodulating the first sequence of compensated pulses to produce a second sequence of demodulated pulses, a third combiner for combining the second sequence of demodulated pulses with the first sequence of pulses to produce a second sequence of error pulses, a third modulator for modulating the second sequence of error pulses to produce a second sequence of modulated error pulses, a fourth combiner for combining the second sequence of modulated error pulses with the first sequence of compensated pulses to produce a second sequence of compensated pulses.

The invention further encompasses an apparatus for pre-compensating for pulse overlap in a digitally modulated orthogonal frequency multiplexed signal comprising an input for receiving a sequence of pulses, a first modulator for modulating the pulses to produce a sequence of modulated pulses, a first storage element for storing the modulated pulses, a first combiner for using non-consecutive pairs of the modulated pulses to produce a sequence of first order error terms, a second storage element for storing the sequence of first order error terms, and a second combiner for subtracting each of the first order error terms from corresponding ones of the modulated pulses to produce a first compensated signal. The apparatus can further comprise a third combiner for using non-consecutive pairs of the first order error terms to produce a sequence of second order error terms, a third storage element for storing the sequence of second order error terms, and a fourth combiner for adding each of the second order error terms to corresponding pulses in the first compensated signal to produce a second compensated signal.

The processing required for this invention can be performed using digital signal processing, wherein the various modulation, demodulation and combining functions can be performed in one or more signal processors.

While the present invention has been described in terms of what are at present believed to be its preferred embodiments, it should be understood that various changes may be made to the described embodiments without departing from the scope of the invention as defined by the claims.

What is claimed is:

1. A method of pre-compensating for pulse overlap in a digitally modulated signal, the method comprising the steps of:
   receiving a sequence of signal pulses;
   modulating the signal pulses to produce a first sequence of modulated pulses;
   demodulating the first sequence of modulated pulses to produce a first sequence of demodulated pulses;
   combining the first sequence of demodulated pulses with the sequence of signal pulses to produce a first sequence of error pulses;
   modulating the first sequence of error pulses to produce a first sequence of modulated error pulses; and
   combining the first sequence of modulated error pulses with the first sequence of modulated pulses to produce a first sequence of compensated pulses.

2. The method of claim 1, further comprising the steps of:
   demodulating the first sequence of compensated pulses to produce a second sequence of demodulated pulses;
   combining the second sequence of demodulated pulses with the sequence of signal pulses to produce a second sequence of error pulses;
   modulating the second sequence of error pulses to produce a second sequence of modulated error pulses; and
   combining the second sequence of modulated error pulses with the first sequence of compensated pulses to produce a second sequence of compensated pulses.

3. A method of pre-compensating for pulse overlap in a digitally modulated signal, the method comprising the steps of:
   receiving a sequence of pulses;
   modulating the pulses to produce a sequence of modulated pulses;
   storing the modulated pulses;
   using non-consecutive pairs of the modulated pulses to produce a sequence of first order error terms;
   storing the sequence of first order error terms; and
   subtracting each of the first order error terms from corresponding ones of the modulated pulses to produce a first compensated signal.

4. The method of claim 3, further comprising the steps of:
   using non-consecutive pairs of the first order error terms to produce a sequence of second order error terms;
   storing the sequence of second order error terms; and
   adding each of the second order error terms to corresponding pulses in the first compensated signal to produce a second compensated signal.

5. An apparatus for pre-compensating for pulse overlap in a digitally modulated signal, the apparatus comprising:
   an input receiving a sequence of signal pulses;
   a first modulator for modulating the signal pulses to produce a first sequence of modulated pulses;
   a first demodulator for demodulating the first sequence of modulated pulses to produce a first sequence of demodulated pulses;
   a first combiner for combining the first sequence of demodulated pulses with the sequence of signal pulses to produce a first sequence of error pulses;

a second modulator for modulating the first sequence of error pulses to produce a first sequence of modulated error pulses; and a second combiner for combining the first sequence of modulated error pulses with the first sequence of modulated pulses to produce a first sequence of compensated pulses.

6. The apparatus of claim 5, further comprising:

a second demodulator for demodulating the first sequence of compensated pulses to produce a second sequence of demodulated pulses;

a third combiner for combining the second sequence of demodulated pulses with the sequence of signal pulses to produce a second sequence of error pulses;

a third modulator for modulating the second sequence of error pulses to produce a second sequence of modulated error pulses; and a fourth combiner for combining the second sequence of modulated error pulses with the first sequence of compensated pulses to produce a second sequence of compensated pulses.

7. A apparatus for pre-compensating for pulse overlap in a digitally modulated signal, the apparatus comprising:

an input for receiving a sequence of pulses;

a first modulator for modulating the pulses to produce a sequence of modulated pulses;

a first storage element for storing the modulated pulses;

a first combiner for using non-consecutive pairs of the modulated pulses to produce a sequence of first order error terms;

a second storage element for storing the sequence of first order error terms; and a second combiner for subtracting each of the first order error terms from corresponding ones of the modulated pulses to produce a first compensated signal.

8. The apparatus of claim 7, further comprising a third combiner for using non-consecutive pairs of the first order error terms to produce a sequence of second order error terms;

a third storage element for storing the sequence of second order error terms; and a fourth combiner for adding each of the second order error terms to corresponding pulses in the first compensated signal to produce a second compensated signal.

9. The method of claim 1, wherein the digitally modulated signal is an orthogonally frequency division multiplexed signal.

10. The method of claim 3, wherein the digitally modulated signal is an orthogonally frequency division multiplexed signal.

11. The apparatus of claim 5, wherein the digitally modulated signal is an orthogonally frequency division multiplexed signal.

12. The apparatus of claim 7, wherein the digitally modulated signal is an orthogonally frequency division multiplexed signal.

13. An apparatus for pre-compensating for pulse overlap in a digitally modulated signal, the apparatus comprising:

means for receiving a sequence of signal pulses;

means for modulating the signal pulses to produce a first sequence of modulated pulses;

means for demodulating the first sequence of modulated pulses to produce a first sequence of demodulated pulses;

means for combining the first sequence of demodulated pulses with the sequence of signal pulses to produce a first sequence of error pulses;

means for modulating the first sequence of error pulses to produce a first sequence of modulated error pulses; and means for combining the first sequence of modulated error pulses with the first sequence of modulated pulses to produce a first sequence of compensated pulses.

14. The apparatus of claim 13, further comprising:

means for demodulating the first sequence of compensated pulses to produce a second sequence of demodulated pulses;

means for combining the second sequence of demodulated pulses with the sequence of signal pulses to produce a second sequence of error pulses;

means for modulating the second sequence of error pulses to produce a second sequence of modulated error pulses; and means for combining the second sequence of modulated error pulses with the first sequence of compensated pulses to produce a second sequence of compensated pulses.

15. A apparatus for pre-compensating for pulse overlap in a digitally modulated signal, the apparatus comprising:

means for receiving a sequence of pulses;

means for modulating the pulses to produce a sequence of modulated pulses;

means for storing the modulated pulses;

means for using non-consecutive pairs of the modulated pulses to produce a sequence of first order error terms;

means for storing the sequence of first order error terms; and means for subtracting each of the first order error terms from corresponding ones of the modulated pulses to produce a first compensated signal.

16. The apparatus of claim 15, further comprising:

means for using non-consecutive pairs of the first order error terms to produce a sequence of second order error terms;

means for storing the sequence of second order error terms; and means for adding each of the second order error terms to corresponding pulses in the first compensated signal to produce a second compensated signal.

* * * * *